United States Patent Office 2,861,877
Patented Nov. 25, 1958

2,861,877

TREATMENT OF SEWAGE SLUDGE

Cecil J. Geraghty, Redwood City, and Richard R. Kennedy, Palo Alto, Calif., assignors to Modoc Peat Moss Company, San Francisco, Calif., a corporation No Drawing. Application July 22, 1954
Serial No. 445,176

3 Claims. (Cl. 71—13)

This invention is concerned with the treatment and disposal of sewage sludges and provides a simple and inexpensive method of handling these vexing materials and also provides a more useful and valuable end product.

Sewage sludges are aqueous masses of finely divided organic material. The solid contents of these sludges is relatively small, usually from about 2% to 15% by weight. When the solids content is in this range little or no additional water can be removed from the sludge by further settling and decantation. Moreover, these sludges are difficult to filter and require tremendous filter areas per pound of solids.

Sewage sludges usually contain fixed nitrogen in addition to carbonaceous material and in some instances it has been economical to dry them and sell the dried product as compost or fertilizer. However, in the majority of instances, the content of fixed nitrogen and other fertilizing elements is such that the cost of preparing the sludge for market is in excess of the market price. Hence in most instances sewage sludge represents nothing but an expensive disposal problem.

Sometimes sewage sludge can be disposed of by barging it to sea or discharging it into a stream. But examples of such practices are becoming scarce, as the public becomes more conscious of the ill effects of water pollution, and even in the past it has generally been sent to shallow ponds where it dries eventually, usually after a period of weeks. To assure that it does dry eventually the ponds may be provided with under-drains. Liquid sludge is flooded into the pond to a depth of a foot or so. Drying proceeds by drainage and evaporation and in relatively dry climates, after about three weeks, the sludge is dry enough to be excavated and thereafter disposed of as dump or fill material or ground for sale as fertilizer. The grinding operation is carried out with a hammermill or the like, but however it is done the operation is disagreeable and costly, for the dried sludge is very abrasive and causes excessive wear on grinding equipment. At the same time the ground material is extremely dusty and therefore disagreeable both during the grinding operation and its subsequent application to agricultural land.

As a result of our investigations, we have developed a novel method for treating and disposing of sewage sludge. It involves no special equipment, considerably less land than that previously required for ponds, etc., and less labor than that previously employed in the old ponding and grinding procedure. Moreover, it provides an end product that is readily saleable, requires no crushing, and is not dusty. By application of the process of the invention the cost of sludge drying and disposal may be greatly reduced so that revenues from the sale of the finished product will more than cover the entire drying and disposal operation. In consequence, a profitable enterprise is now possible, whereas in the past most sludge operations have operated at a loss.

In accordance with our invention we filter sewage sludge into a layer of loose porous (and preferably fibrous) cellulosic material (preferably peat moss) and thus partially de-water the sludge. Thereafter, when the moisture content of the resulting mass of sludge and porous cellulosic material is in the range of 50% to 70% the mass is subjected to a tilling operation which breaks it up into a product which is ready for market either immediately or after a short drying period.

The process of the invention can be carried out in the following manner, which in many respects is really a preferred procedure because it may be employed to give a better end product and one that meets with more favor for application to agricultural land. In accordance with this procedure a shallow reservoir or bed, preferably with a porous bottom, is prepared. This may be done simply by putting dykes two feet or so high around a level field. The cellulosic material (say peat moss) is spread over the bottom of the reservoir to form a shallow layer a few inches thick. The reservoir is then flooded with the sewage sludge so that the cellulosic material is substantially submerged, optimum results being obtained when the depth of the cellulosic material is at least one quarter the depth of the resulting sludge pool. Then the mass is left until by evaporation plus drainage into the subsoil or laterally through the sides of the reservoir or both the moisture content of the mass is reduced to the range of about 50% to 70%. Ordinarily this will require three days to a week, during which the sludge composts aerobically, as well as dries. Then the mass is tilled, preferably with ordinary mechanical garden tillers of the rotating disc type. This mixes the sludge cake and the underlying peat moss. The tilled mass is then re-flooded and after drying, again tilled, this sequence of operation being repeated four or five times or until the capacity of the bed for absorbing sludge is reduced to a low value. After a final tilling the sludge-cellulosic mixture is in an attractive condition for garden and agricultural uses. It may be loaded directly from the bed by hand or with any type of front end loader or may be pushed off the bed and piled with a bulldozer blade. In cities where there is a demand for garden fertilizers the material may be further ground and bagged for retail sale.

The optimum drying period prior to tilling will vary depending upon several factors, including weather, the nature of the cellulosic material, the percent solids in the sludge, and the ratio of sludge to cellulosic material in the bed. The best way to determine the optimum time is by trial—i. e., tilling should be commenced as soon as it can be done without having the sludge "gum up" and adhere to the tool.

Re-sanding of the sludge bed or reservoir is not necessary, this in itself representing a considerable saving. After the removal of the mixture a new layer of peat moss or the like is spread and the dry bed is immediately available against for receiving sludge.

As indicated above, a layer of porous material, say peat moss, three or four inches deep is satisfactory. The peat moss need not be smoothed out but allowed to stand as it falls with a rough irregular upper surface.

The drying of the sludge occurs rapidly due to absorption of its liquid content into the porous medium and also due to the wick action of the medium which tends to break up the otherwise stable colloidal sludge suspensions into separate liquid and solid phases.

Sludge reservoirs with under-drain facilities are desirable in the practice of the invention, but they are not essential—for when under-drain systems are not provided the drying may be speeded by allowing for a lateral flow of liquid through the porous medium to drainage pipes disposed through the bottoms of the dykes which confine the ponds.

Under relatively dry weather conditions in California a sludge pool a foot thick will, when formed and treated as described above, dry sufficiently in four days to permit mixing or tilling.

After final tilling, further drying of the mixture will proceed rapidly by evaporation and within a short time, say a day or two, the material can be removed from the bed or re-used to absorb another batch of liquid sludge.

After final tilling the material may be removed from the bed much more easily than dried sludge cake.

The impregnated material has the ability to hold a relatively high proportion of moisture, say 50% to 70%, without becoming gummy or sticky and hence if a grinding operation is desired it may be conducted without creating dust.

We employ the term "sewage sludge" to include digested sewage sludge, raw sludge, raw organic industrial wastes, sewage screenings, etc. All of these materials are stabilized by the aerobic digestion or composting which occurs while the sludge is present in the partially dried porous medium.

A variety of porous cellulosic materials may be employed although as indicated above, peat moss is preferred. Thus the operation of the invention has been performed successfuly with ground rice hulls, ground seed shells such as those of walnuts, apricots and almonds, shredded paper, sawdust and wood shavings and reed and sedge peat. All of these porous materials are used in the invention with varying degrees of efficiency. Green sawdust and green wood shavings are good absorbents and compost readily. Kiln dried sawdust and shavings absorb water more easily and have more wick action, so that they have a pronounced action in breaking up sludge colloids and also compost well. Charcoal in the porous medium, such as is obtained when sawdust or the like is charred, confers a further advantage in that it adsorbs and absorbs ammonia.

Peat moss and to a lesser extent sedge and reed peats, have good absorption and wick action and also tend to combine chemically with ammonia and other soluble materials in the liquid phase of the sludge. Peat moss has an intricate structure and great surface area. Moreover, it mixes more readily with the filtered solids and does not tend to pack. Apparently because it is itself a stabilized organic material, peat moss seems to effect a rapid stabilization of raw and incompletely digested sewage sludges and industrial wastes, neutralizing odors and bringing about a rapid aerobic digestion while composting while the material is still in the pond in a partially dried state.

The invention will be understood completely in the light of the following detailed description of the presently preferred practice:

*Example 1*

In this case a reservoir was made on flat ground building up a dyke about two feet high around its edges, the enclosed area being about fifty yards square. The area had no artificial under-drain but was on relatively sandy soil. Peat moss from a deposit at Likely, Modoc County, California, and containing about 35% moisture was spread with a bulldozer over the bottom of the reservoir to a depth of three to six inches, no particular effort being made to hold the mass to a uniform thickness. The reservoir was then flooded with digested sewage sludge containing about 8% solids to a depth of about fifteen inches. Drainage from the reservoir was permitted to take place laterally through three inch pipes placed in the sides of the dyke at its bottom on twenty foot centers. Some drainage also occurred into the subsoil. After four days of dry weather under the conditions prevailing in the spring in central California, drying had proceeded to the point where the sludge formed an apparently solid layer over and in the peat moss. The moisture content of the combined peat moss and sludge was then about 60%. A regular motorized garden disc tiller was then run over the reservoir to till the sludge cake into the underlying peat moss. The tilled mass was then re-flooded to a depth of about 15 inches, again allowed to dry for four days and again tilled, this sequence of operations being repeated five times. Then the mixture was given a final tilling, scraped into a pile with a bulldozer and loaded into trucks for sale. The final product contained about 35% moisture and 3 to 5 parts of sewage sludge for each part of peat moss by weight. During the approximately twenty days involved in the operation, the raw sewage sludge composted readily and at no time was there an odor nuisance. The analysis of the final product was as follows:

|  | As Is | Calculated Dry Basis |
|---|---|---|
|  | Percent | Percent |
| Moisture | 37.94 | -------- |
| Ash | 28.62 | 46.12 |
| Total Nitrogen | 1.28 | 2.06 |
| Total Phosphoric Acid (P$_2$O$_5$) | 0.10 | 0.16 |
| Total Potash (K$_2$O) | 0.21 | 0.34 |

The above analysis is representative of the product made in accordance with the invention, but the analysis may vary considerably depending on the base material used to the sewage sludge.

We claim:

1. In the treatment of sewage sludge to form a compost, the improvement which comprises placing a layer of loose porous cellulosic material over a relatively flat bottom of a shallow reservoir provided with drainage, flooding the layer in the reservoir with sewage sludge containing from about 2% to about 15% by weight of solids to form a pool of sludge in the reservoir that is several times deeper than the layer but with the layer being at least one quarter of the depth of the pool, permitting the flooded layer in a quiescent state to drain by gravity while it is exposed to the air so that liquid is removed from the pool and the solids of the sludge filter into and impregnate the layer and are also composted, the drainage being continued until the impregnated cellulosic material can be tilled without sticking appreciably to the tilling tool, thereafter tilling the drained impregnated layer in place in the reservoir, and repeating the flooding and drainage steps described above in turn of the order of four times until the layer is impregnated with about 3 to about 5 parts by weight of sewage sludge for each part by weight of cellulosic material.

2. In the treatment of sewage sludge to form a compost, the improvement which comprises placing a layer of loose porous cellulosic material over a relatively flat bottom of a shallow reservoir provided with drainage, flooding the layer in the reservoir with sewage sludge containing from about 2% to about 15% by weight of solids to form a pool of sludge in the reservoir that is several times deeper than the layer but with the layer being at least one quarter of the depth of the pool, permitting the flooded layer in a quiescent state to drain for several days while it is exposed to the air so that liquid is removed from the pool and the solids of the sludge filter into and impregnate the layer and are also composted, the drainage being continued until the moisture content of the combined sludge and cellulosic material has been reduced substantially and is in the range of 50% to 70%, thereafter tilling the drained impregnated layer in place in the reservoir, repeating the flooding and drainage steps described above in turn of the order of four times until the layer is impregnated with about 3 to about 5 parts by weight of sewage sludge for each part by weight of cellulosic material, and drying the resulting impregnated mass.

3. In the treatment of sewage sludge to form a compost, the improvement which comprises placing a layer of loose porous peat moss over a relatively flat bottom of a shallow reservoir provided with drainage, flooding the layer in the reservoir with sewage sludge containing from about 2% to about 15% by weight of solids to form a pool of sludge in the reservoir that is several times deeper than the layer but with the layer being at least one quarter of the depth of the pool, permitting the flooded layer in a quiescent state to drain for several days while it is exposed to the air so that liquid is removed from the pool and the solids of the sludge filter into and impregnate the peat moss of the layer and are also composted, the drainage being continued until the moisture content of the combined sludge and peat moss has been reduced substantially and is in the range of 50% to 70%, thereafter tilling the drained impregnated layer in place in the reservoir, repeating the flooding and drainage steps described above in turn of the order of four times until the layer is impregnated with about 3 to about 5 parts by weight of sewage sludge for each part by weight of peat moss, and drying the resulting impregnated mass.

References Cited in the file of this patent

UNITED STATES PATENTS

| | | |
|---|---|---|
| 154,092 | Scott | Aug. 11, 1874 |
| 281,693 | Hogan | July 24, 1883 |
| 659,503 | Wood | Oct. 9, 1900 |
| 1,122,156 | Pratt | Dec. 22, 1914 |
| 1,123,414 | Smith | Jan. 5, 1915 |
| 1,188,340 | Tark | June 20, 1916 |
| 2,130,249 | Raisch | Sept. 13, 1938 |
| 2,220,134 | Townsend | Nov. 5, 1940 |

OTHER REFERENCES

Industrial and Engineering Chemistry, "Industrial Wastes," vol. 46, No. 9, September 1954, pages 95A, 96A, 98A.